(No Model.) 2 Sheets—Sheet 1.

H. J. HYAMS.
APPARATUS FOR TREATMENT OF NATURAL GAS.

No. 356,071. Patented Jan. 11, 1887.

(No Model.) 2 Sheets—Sheet 2.
H. J. HYAMS.
APPARATUS FOR TREATMENT OF NATURAL GAS.
No. 356,071. Patented Jan. 11, 1887.
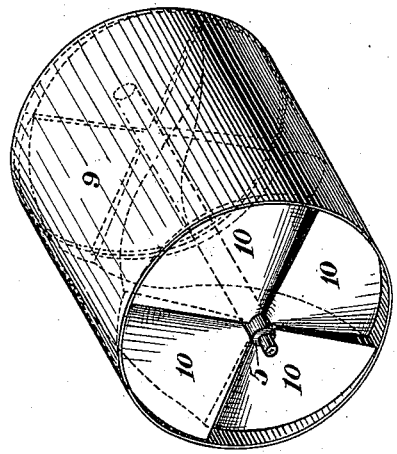
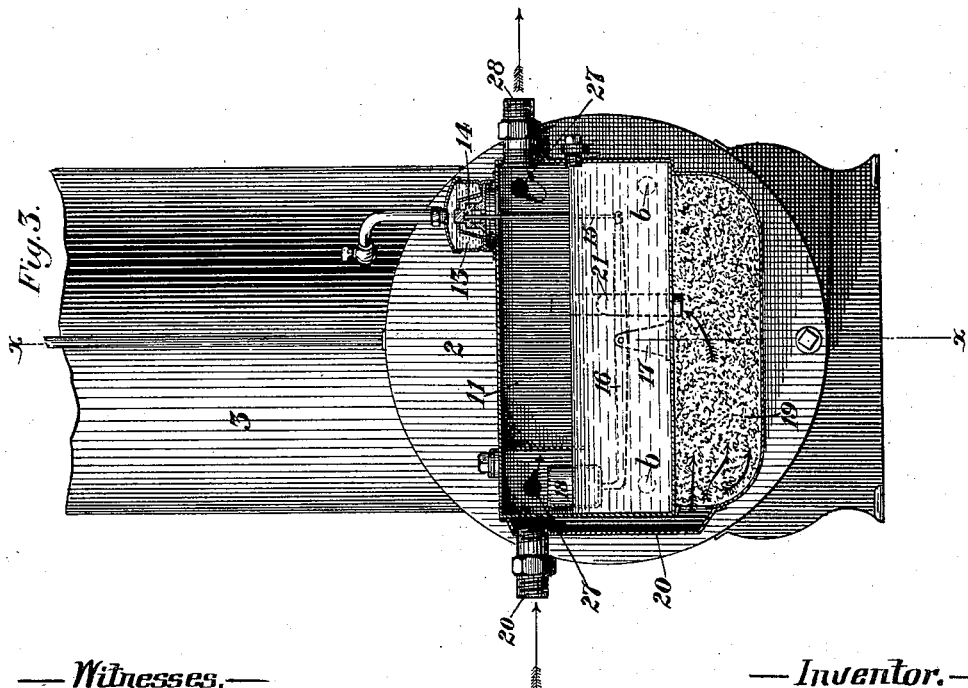

UNITED STATES PATENT OFFICE.

HYAM J. HYAMS, OF PITTSBURG, PENNSYLVANIA, ASSIGNOR TO THE PITTSBURG SUPPLY COMPANY, (LIMITED,) OF SAME PLACE.

APPARATUS FOR TREATMENT OF NATURAL GAS.

SPECIFICATION forming part of Letters Patent No. 356,071, dated January 11, 1887.

Application filed April 10, 1886. Serial No. 198,449. (No model.)

*To all whom it may concern:*

Be it known that I, HYAM J. HYAMS, of Pittsburg, in the county of Allegheny and State of Pennsylvania, have invented a new and useful Improvement in Apparatus for Treatment of Natural Gas; and I do hereby declare the following to be a full, clear, and exact description thereof.

My invention is designed for use in carbureting natural gas for illuminating purposes, and is illustrated in the apparatus shown in the accompanying drawings, in which—

Figure 1:
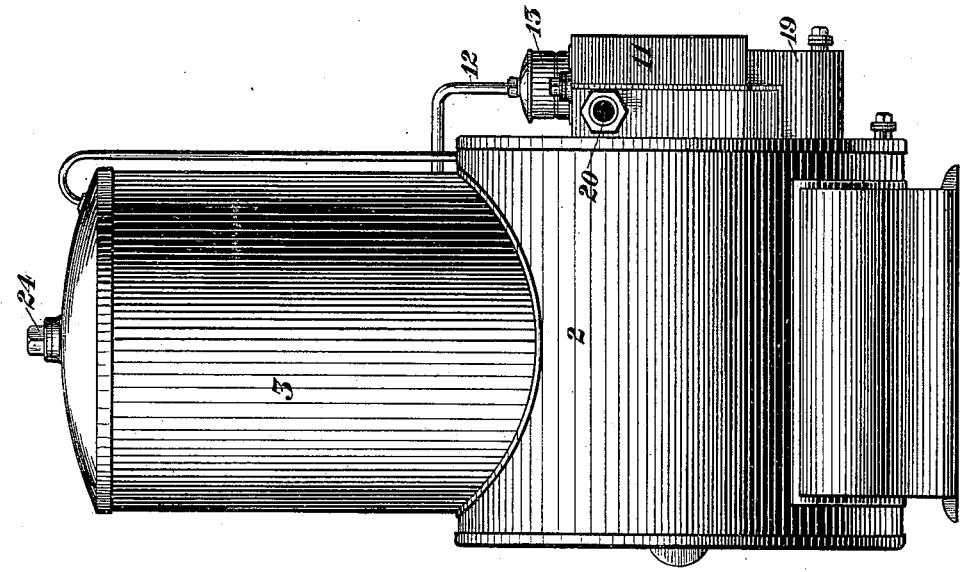
Figure 2:
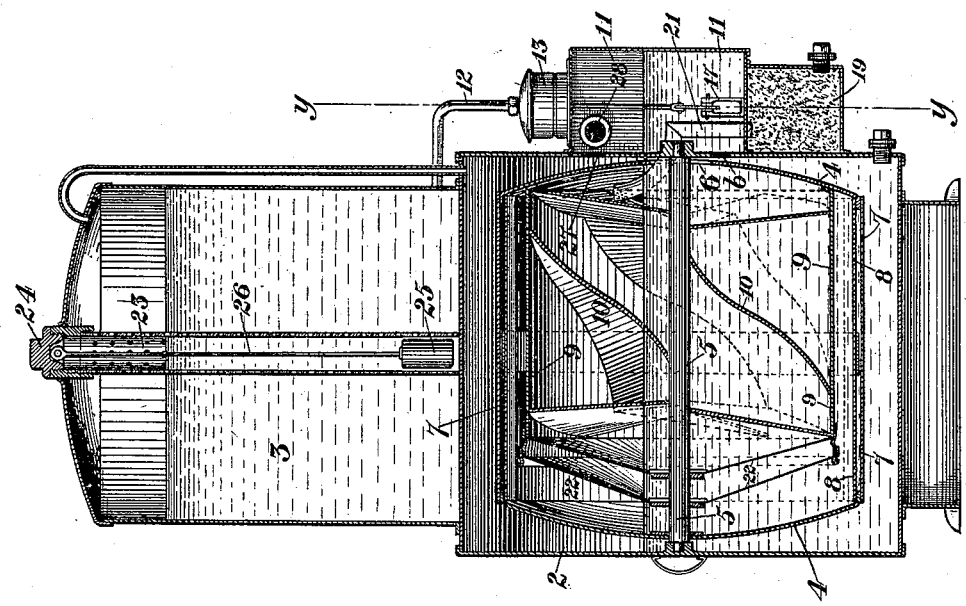

Figure 1 is a side view of the carbureter. Fig. 2 is a vertical section thereof on the line x x of Fig. 3. Fig. 3 is a vertical section on the line y y of Fig. 2. Fig. 4 is a detached perspective view of a part.

Like symbols of reference indicate like parts in each.

In the drawings, 2 is the carbureting-chamber. Mounted upon it is a tank, 3, in which the gasoline or other carbureting-fluid is stored and from which it is fed to the carbureting-chamber.

4 is a rotary drum journaled by a shaft, 5, within the chamber 2. The ends of the drum are closed, except that in the front end wall there is a hole, 6, surrounding and concentric with the shaft 5. The periphery of the drum 4 is constituted by a cloth covering, 7, which is stretched over longitudinal strips or battens 8. (See Fig. 2.) These strips 8 serve as a frame, over which the cloth 7 is stretched.

9 is a smaller drum arranged within the drum 4 and fixed to the shaft 5. The cylindrical side of the drum 9 is closed and its ends are open, while within the drum is a series of inclined vanes, 10, arranged in the manner of the blades of propeller-screws and fixed to the inner sides of the drum. Over the rear open end of the drum 9 are stretched one or more diaphragms, 22, of cotton cloth. (See Fig. 2.)

11 is a regulating or supply chamber fixed to the front end of the chamber 2 and communicating directly therewith through holes *b*. A pipe, 12, leads from the tank 3 into a valve-chamber, 13, which is mounted upon the chamber 11, and communicates therewith through a port, which is controlled by a valve, 14. The stem 15 of this valve extends into the chamber 11, and is there connected to the end of a lever, 16, fulcrumed to a standard, 17, and having at its free end a float, 18. When the chamber 11 is empty, the float, dropping to the bottom of the chamber, will open the valve 14. The gasoline will then flow from the tank 3 through the pipe 12 into the chamber 11, and through the holes *b* into the chamber 2 and drums 4 and 9, until it reaches a level sufficient to raise the float to the position shown in Fig. 3, when the valve will be closed and further entrance of fluid cut off. Any descent of the float will correspondingly open the valve to admit more fluid, so that by its means the level of the gasoline in the drums and in the chamber 11 is kept constant and high enough to close the hole 6, thus sealing the chamber 11 from the carbureting-chamber 2.

19 is a box underneath the chamber 11, containing cotton-waste. A gas-supply pipe, 20, opens into this box, and a pipe, 21, leads therefrom through the hole 6 into the mouth of the drum 9, above the level of the gasoline.

Of the remaining parts of the apparatus, 23 is a tube extending through the tank 3 to the top, where it is provided with a screw-plug, 24. This tube is perforated and the gasoline fluid is fed to the tank through its upper end.

25 is a float having an upright rod, 26. These are placed within the tube 23 and serve to indicate the level of the fluid in the tank.

The operation is as follows: It is well-known that natural gas escapes from the earth at a considerable pressure, and is thus conveyed and distributed through the service-pipes. The gas therefore enters at pressure through the pipe 20, and, after passing through the cotton-filled box 19 discharges into the drum 9 through the pipe 21. The current of gas passing through this drum and acting on the vanes 10 will rotate the drum 9, together with the drum 4, continuously on their axis within the carbureting-chamber, thus bringing all parts of the cloth diaphragms 22 and 7 successively into the fluid in the vessel 2 and keeping them constantly saturated. When the gas reaches the rear end of the drum 9, it passes through the meshes of the saturated cloth, 22, and thence, escaping upward into the annular space between the drums 4 and 9, passes through the saturated cloth covering 7 into the upper part of the chamber 2. Thence the gas flows to the front of this chamber and through holes 27 in the front wall of the latter into the chamber 11, where it discharges through the pipe 28 and is conveyed to the place of use.

I have reduced my invention to actual practice, and find that the apparatus acts excellently, the gas being so carbureted by its passage through the wet cloths that its illuminating properties are greatly increased. The drum 9 is driven solely by the motive power of the gas, and an even steady current of gas is thus maintained. The purpose of the cotton-filled chamber 19 is to equalize the gas flow; but it is not indispensable to my improvement.

I am aware that I am not the inventor of a carbureting apparatus in which there is a cloth-covered drum mounted within a chamber containing gasoline, the drum being provided with vanes and rotated by a weight or other mechanical device, for the purpose of pumping air into the chamber and saturating it with gasoline vapor. Such apparatus is shown in United States Patents Nos. 262,651 and 61,739. My carburetor differs from this in that I use no weights for driving the drum, but for this purpose employ only the motive power of the gas.

I am also aware of Letters Patent No. 200,000, which show and describe a rotary double drum arranged on a single shaft in a chamber containing gasoline and provided with vanes. A gas-supply pipe enters one part of the drum, and an air-inlet pipe opens into the other part. The force of the entering gas rotates the drums and pumps in air through the air-inlet pipe, which mingles with the gas, and both the air and gas in passing over the surface of the gasoline are somewhat carbureted. The rotation of the drum does not, however, effect the carbureting of the air or gas, since there is no cloth diaphragm or equivalent device which takes up the gasoline as the drum revolves and exposes it to the gas-current, (as in my carburetor;) but, on the contrary, the rotation of the drum is solely for the purpose of pumping air into the carbureting-chambers, where it, together with the gas, is carbureted by passing over the surface of the gasoline in the tank, and not by passing through a diaphragm or covering rotated and kept saturated by the rotation of the drum.

I believe myself to be the inventor of a carburetor having a gasoline-tank, a rotary drum arranged in the tank, provided with vanes and with a cloth covering or diaphragm, which, by rotation of the drum, is subjected to and saturated by the gasoline liquid, and through which cloth the gas must pass in its flow through the apparatus, the drum being rotated, not by weights or other mechanical appliances, but by the motive force of the gas-current, which both rotates the drum and causes the saturation of the cloth through which the gas passes to be carbureted. The principal advantage of my invention is that it provides an efficient automatic carbureting apparatus. It has been put into practical use and has been found to be of great utility.

I claim—

In an apparatus for carbureting natural gas, the combination of a carbureting-chamber, a rotary drum mounted therein and provided with interior inclined vanes and with a cloth diaphragm, a gas-pipe discharging gas under pressure into said drum, and a pipe leading from said carbureting-chamber to the place of use, whereby the drum is rotated by the motive power of the gas, and the saturation of the cloth diaphragm thereby maintained, substantially as and for the purposes described.

In testimony whereof I have hereunto set my hand this 7th day of April, A. D. 1886.

HYAM J. HYAMS.

Witnesses:
THOMAS W. BAKEWELL,
JOSHUA GOLDTHORP.